US012609002B2

(12) United States Patent
Aicken et al.

(10) Patent No.: US 12,609,002 B2
(45) Date of Patent: Apr. 21, 2026

(54) SYSTEMS AND METHODS FOR DYNAMICALLY ADJUSTING PARAMETERS IN ELECTRONIC GAMING ENVIRONMENTS

(71) Applicant: Roxor Gaming Limited, London (GB)

(72) Inventors: Thomas Aicken, Worthing (GB); Hans Elias, St Albans (GB); John Perrett, London (GB)

(73) Assignee: Roxor Gaming Limited, London (GB)

( * ) Notice: Subject to any disclaimer, the term of this patent is extended or adjusted under 35 U.S.C. 154(b) by 202 days.

(21) Appl. No.: 18/737,557

(22) Filed: Jun. 7, 2024

(65) Prior Publication Data

US 2025/0285510 A1 Sep. 11, 2025

Related U.S. Application Data

(60) Provisional application No. 63/563,154, filed on Mar. 8, 2024.

(51) Int. Cl.
*G07F 17/32* (2006.01)
*G07F 17/34* (2006.01)

(52) U.S. Cl.
CPC .......... *G07F 17/3267* (2013.01); *G07F 17/34* (2013.01)

(58) Field of Classification Search
None
See application file for complete search history.

(56) References Cited

U.S. PATENT DOCUMENTS 7,390,263 B1 * 6/2008 Acres .................. G07F 17/3251 463/27
2006/0046821 A1 * 3/2006 Kaminkow ........... G07F 17/326 463/16
2008/0108428 A1 * 5/2008 Thomas .................. G07F 17/32 463/25
2011/0151966 A1 * 6/2011 Hawkins ............. G07F 17/3248 463/25
2014/0162757 A1 * 6/2014 Moody ................... G07F 17/34 463/20
2021/0183205 A1 * 6/2021 Meister-Gronau ... G06Q 20/045
2023/0033823 A1 * 2/2023 Yi ....................... G07F 17/3272
2025/0285510 A1 * 9/2025 Aicken ................... G07F 17/34

OTHER PUBLICATIONS

International Search Report and Written Opinion issued in App. No. PCT/US2025/17673, dated Jun. 11, 2025, 13 pages.

* cited by examiner

*Primary Examiner* — Omkar A Deodhar
(74) *Attorney, Agent, or Firm* — Armstrong Teasdale LLP

(57) ABSTRACT

An electronic gaming system including a memory and a processor is described. The processor is configured to receive a first input from a first electronic gaming device associated with initiation of a first play and receive a second input from a second electronic gaming device associated with initiation of a second play. The processor is also configured to cause a first game outcome for the first play to be determined and cause a second game outcome for the second play to be determined. The processor is also configured to cause the first output amount to be provided to the first player account and, based upon the first output amount associated with a first output amount ID being provided to the first player account, cause a replacement game outcome to be determined as a replacement for the second game outcome.

20 Claims, 19 Drawing Sheets

800

900

1100

FIG. 12
SPIN
AUTO
WIN
BONUS
BONUS

1200

1300

1400

1500

1600

1700

SYSTEMS AND METHODS FOR DYNAMICALLY ADJUSTING PARAMETERS IN ELECTRONIC GAMING ENVIRONMENTS

CROSS REFERENCE TO RELATED APPLICATIONS

This application claims the benefit of priority to U.S. Provisional Patent Application No. 63/563,154, filed Mar. 8, 2024, which is hereby incorporated by reference herein in its entirety.

TECHNICAL FIELD

The field of disclosure relates generally to dynamically adjusting parameters in electronic gaming environments, and more specifically, to dynamically adjusting jackpot parameters in electronic gaming environments.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system including at least one memory with instructions stored thereon and at least one processor in communication with the at least one memory is described. The instructions, when executed by the at least one processor, cause the at least one processor to receive a first input from a first electronic gaming device associated with initiation of a first play of an electronic game at the first electronic gaming device wherein the first electronic gaming device is associated with a first player account and receive a second input from a second electronic gaming device associated with initiation of a second play of the electronic game at the second electronic gaming device wherein the second input is received after the first input and wherein the second electronic gaming device is associated with a second player account. The instructions also cause the at least one processor to cause a first game outcome for the first play to be determined wherein the first game outcome includes a first output amount associated with a first output amount identifier (ID) and cause a second game outcome for the second play to be determined wherein the second game outcome includes the first output amount associated with the first output amount ID. The instructions further cause the at least one processor to cause the first output amount to be provided to the first player account in response to determining that the first output amount associated with the first output amount ID has not previously been provided and, based upon the first output amount associated with the first output amount ID being provided to the first player account, cause a replacement game outcome to be determined as a replacement for the second game outcome to prevent the first output amount associated with the first output amount ID from being provided to multiple player accounts.

In another aspect, at least one non-transitory computer-readable storage medium with instructions stored thereon is described. The instructions, in response to execution by at least one processor, cause the at least one processor to receive a first input from a first electronic gaming device associated with a first play of an electronic game at the first electronic gaming device wherein the first electronic gaming device is associated with a first player account and receive a second input from a second electronic gaming device associated with a second play of the electronic game at the second electronic gaming device wherein the second input is received after the first input and wherein the second electronic gaming device is associated with a second player account. The instructions also cause the at least one processor to control a first game outcome for the first play to be determined wherein the first game outcome includes a first output amount associated with a first output amount identifier (ID) and control a second game outcome for the second play to be determined wherein the second game outcome includes the first output amount associated with the first output amount ID. The instructions further cause the at least one processor to control the first output amount to be provided to the first player account based upon determining that the first output amount associated with the first output amount ID has not previously been provided and, in response to the first output amount associated with the first output amount ID being provided to the first player account, control a replacement game outcome to be determined as a replacement for the second game outcome to prevent the first output amount associated with the first output amount ID from being provided to multiple player accounts.

In another aspect, a method of electronic gaming implemented by at least one processor in communication with at least one memory is described. The method includes receiving a first input from a first electronic gaming device associated with initiation of a first play of an electronic game at the first electronic gaming device wherein the first electronic gaming device is associated with a first player account and receiving a second input from a second electronic gaming device associated with initiation of a second play of the electronic game at the second electronic gaming device wherein the second input is received after the first input and wherein the second electronic gaming device is associated with a second player account. The method also includes causing a first game outcome for the first play to be determined wherein the first game outcome includes a first output amount associated with a first output amount identifier (ID) and causing a second game outcome for the second play to be determined wherein the second game outcome includes the first output amount associated with the first output amount ID. The method further includes causing the first output amount to be provided to the first player account in response to determining that the first output amount associated with the first output amount ID has not previously been provided and, based upon the first output amount associated with the first output amount ID being provided to the first player account, causing a replacement game outcome to be determined as a replacement for the second game outcome to prevent the first output amount.

In another aspect, an electronic gaming system including at least one memory with instructions stored thereon and at least one processor in communication with the at least one memory is described. The instructions, when executed by the at least one processor, cause the at least one processor to randomly determine first output parameters for an electronic game played by a plurality of player accounts, the first output parameters including a starting first output amount, a target first output amount greater than the starting first output amount, and a first accrual rate defining a first rate at which the first output amount will increase between the starting first output amount and the target first output amount and cause the electronic game to be provided according to the first output parameters, including determining a current first output amount between the starting first output amount and the target first output amount based on the first accrual rate as first plays of the electronic game occur. The instructions also cause the at least one processor to cause the current first output amount to be provided to a player account of the plurality of player accounts in response to play of the electronic game associated with the player account triggering an outcome including the current first output amount. The instructions further cause the at least one processor to, in response to causing the current first output amount to be provided, randomly determine second output parameters for the electronic game, the second output parameters including a starting second output amount, a target second output amount greater than the starting second output amount, and a second accrual rate defining a second rate at which the second output amount will increase between the starting second output amount and the target second output amount and update the electronic game from being provided according to the first output parameters to being provided according to the second output parameters.

DETAILED DESCRIPTION

Figure 1:
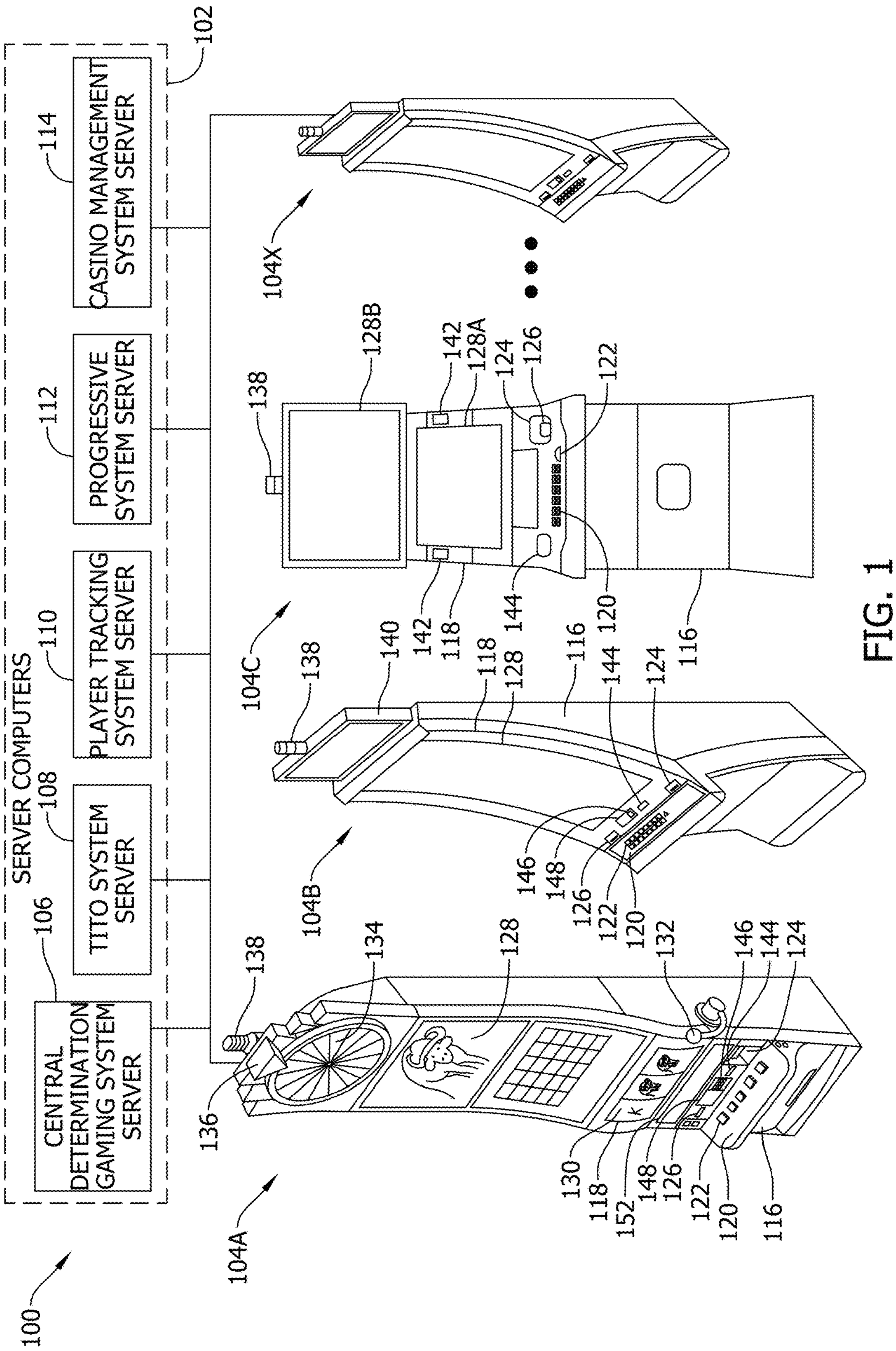
FIG. 1 is an exemplary diagram showing several EGMs networked with various gaming related servers.

Described herein are systems and methods for dynamically adjusting parameters (e.g., jackpot parameters) in electronic gaming environments. For instance, in some electronic games (e.g., "Must Drop" or "Must Hit By" electronic games that include jackpots), the probability of hitting a jackpot approaches one (e.g., 100%) as the jackpot value approaches a target value. The present disclosure provides dynamic drop seeds that randomly vary a reseed value (e.g., starting value of a new jackpot after a previous jackpot is provided), a must drop by target value (e.g., the value at which the probability of hitting a jackpot is 100%), and/or the accrual rate of the jackpot (e.g., the rate at which the jackpot grows) after a previous jackpot is triggered and provided. The systems and methods described herein further ensure that, when a player wins a jackpot, any game outcomes provided to players after the jackpot was provided will be based on new, reseeded jackpot probabilities (e.g., the same jackpot will not be provided to multiple players).

Often, a target value for a jackpot is a static number that allows players to predict and/or "game" the system (e.g., allowing players to maximize their returns in attempting to hit the jackpot prize by playing more and more as the target value is approached). For instance, a player may only decide to participate in an electronic game once a jackpot reaches a certain value. A player could also estimate or predict how long it may take for a jackpot to reach the value if the accrual rate (e.g., jackpot growth rate) is also a fixed value. To avoid at least the above cheat or collusion techniques caused by game predictability and technical limitations of known electronic games, the present disclosure provides improved randomness in dynamically adjusted parameters in electronic gaming.

For example, some technical solutions provided herein include providing more randomness in dynamically adjusted parameters in electronic gaming by randomly determining one or more output (e.g., jackpot) parameters, including: i) the "Must Drop" target value upon seeding/reseeding the jackpot, ii) the reseeding value of the jackpot (e.g., the starting value once the jackpot is reseeded), and/or iii) the accrual rate of the jackpot (e.g., the rate at which the jackpot grows).

Injecting more randomness in "Must Drop" electronic games also creates a "race condition" that conventional "Must Drop" electronic games would not need to handle. For example, known "Must Drop" electronic games may include static jackpot values. Accordingly, if a second player account hits a jackpot right after a first player account hits the jackpot, the first player account and the second player account would receive the same, static jackpot value. However, in a dynamic drop seeing implementation, the jackpot values are not static and may differ from a prior jackpot pool or offering. As a result, if gaming platforms do not manage and update a reseeded jackpot value properly (e.g., after a first player is provided a first jackpot value), a second player could receive an improper jackpot value (e.g., the first jackpot value instead of the reseeded jackpot value).

In other words, technical problems, such as a race condition, arise based upon further randomness (e.g., as described herein) being provided in "Must Drop" electronic games. For example, technical problems may occur if two player accounts trigger the same jackpot value at nearly the same time. In such a scenario, a first player account may receive the jackpot value and, before the gaming platform is able to "reseed" the jackpot to an updated jackpot value, a second player account may improperly receive the same jackpot value as the first player account instead of being provided with a game outcome after the reseeding of the jackpot (e.g., that should occur when the first player account is provided with the jackpot value and before any other player accounts are provided with the jackpot value).

Further, it is costly, labor-intensive, and time-consuming if two player accounts are provided with the same jackpot value, as explained above. For instance, a casino operator and/or game provider may be required to remedy the error by determining which player account should have correctly received the jackpot value (e.g., which player account triggered the jackpot first). The player associated with the player account from which the jackpot value is removed (e.g., because the jackpot value was incorrectly provided) may also become frustrated.

Additionally, known jackpots may not be static (e.g., not a fixed amount) buy may have a consistent reseed model between jackpot wins. In race conditions for jackpots that are not static, a player may think they are winning a relatively high jackpot value but instead (e.g., if another player won the relatively high jackpot value just before the above player triggered a jackpot) win the reseed, relatively lower jackpot value (e.g., a lower amount than their game displays to them, because the system has not had time to adjust the display to the reseed value after the other player won the relatively high jackpot).

Yet further, in some known systems, a jackpot is a centrally determined mystery jackpot. In these scenarios, no race condition is created as there is no in-game display of a jackpot win or potential win until this mystery jackpot has been allocated to an individual by a central system and only that individual will see the jackpot win visuals (e.g., the outcome is already known to the system, it is just not known by the player). However, the mystery jackpot approach restricts how jackpot wins are determined and how potential jackpot wins are displayed in a game.

Further, in some embodiments (e.g., when a "Must Drop" time is provided), after a jackpot is provided, jackpots may be unwinnable for players until a next must drop time starts (e.g., one hour, or another predefined time, as a reseed value is provided and the jackpot grows over the predefined time from the reseed value based upon accumulated contributions).

To address at least the above technical problems, the present disclosure further provides identification of race conditions (e.g., games associated with different player accounts triggering a same jackpot) as an error and recalculates outcomes for player accounts that may otherwise improperly receive a jackpot amount that was already provided to a different player account. For instance, in the example embodiment, payout identifiers (IDs) are implemented with different jackpot amounts such that, if a jackpot amount associated with a first payout ID is provided to a player account, any subsequent game outcomes that include the first payout ID will be identified as errors and sent back to the game logic (e.g., the game backend) for a new outcome to be generated based at least in part upon odds associated with a reseeded jackpot after the initial jackpot amount was provided. Further, if a jackpot is properly won, players will be provided with a correct jackpot amount corresponding to a displayed jackpot amount (e.g., rather than, continuing the above example, a jackpot amount lower than what is displayed).

As an example, new computer components may be utilized to implement the new payout IDs described herein. For instance, a payout ID generator component may be utilized to generate payout IDs and assign them to jackpots. As another example, a locking component may "lock" payout IDs after jackpots associated with the payout IDs are provided (e.g., to prevent the jackpots associated with the payout IDs from being provided a second time, incorrectly).

In other words, in some embodiments, an electronic gaming system is provided that includes at least one memory with instructions stored thereon and at least one processor in communication with the at least one memory wherein the instructions, when executed by the at least one processor, cause the at least one processor to receive a first input from a first electronic gaming device associated with initiation of a first play of an electronic game at the first electronic gaming device wherein the first electronic gaming device is associated with a first player account and receive a second input from a second electronic gaming device associated with initiation of a second play of the electronic game at the second electronic gaming device wherein the second input is received after the first input and wherein the second electronic gaming device is associated with a second player account. The instructions further cause the at least one processor to cause a first game outcome for the first play to be determined wherein the first game outcome includes a first output amount associated with a first output amount identifier (ID) and cause a second game outcome for the second play to be determined wherein the second game outcome includes the first output amount associated with the first output amount ID. The instructions also cause the at least one processor to cause the first output amount to be provided to the first player account in response to determining that the first output amount associated with the first output amount ID has not previously been provided and, based upon the first output amount associated with the first output amount ID being provided to the first player account, cause a replacement game outcome to be determined as a replacement for the second game outcome to prevent the first output amount associated with the first output amount ID from being provided to multiple player accounts.

Further, in some embodiments, an electronic gaming system is provided that includes at least one memory with instructions stored thereon and at least one processor in communication with the at least one memory wherein the instructions, when executed by the at least one processor, cause the at least one processor to randomly determine first output parameters for an electronic game played by a plurality of player accounts, the first output parameters including a starting first output amount, a target first output amount greater than the starting first output amount, and a first accrual rate defining a first rate at which the first output amount will increase between the starting first output amount and the target first output amount. The instructions also cause the at least one processor to cause the electronic game to be provided according to the first output parameters, including determining a current first output amount between the starting first output amount and the target first output amount based on the first accrual rate as first plays of the electronic game occur, and cause the current first output amount to be provided to a player account of the plurality of player accounts in response to play of the electronic game associated with the player account triggering an outcome including the current first output amount. The instructions further cause the at least one processor to, in response to causing the current first output amount to be provided, randomly determine second output parameters for the electronic game, the second output parameters including a starting second output amount, a target second output amount greater than the starting second output amount, and a second accrual rate defining a second rate at which the second output amount will increase between the starting second output amount and the target second output amount, and update the electronic game from being provided according to the first output parameters to being provided according to the second output parameters.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
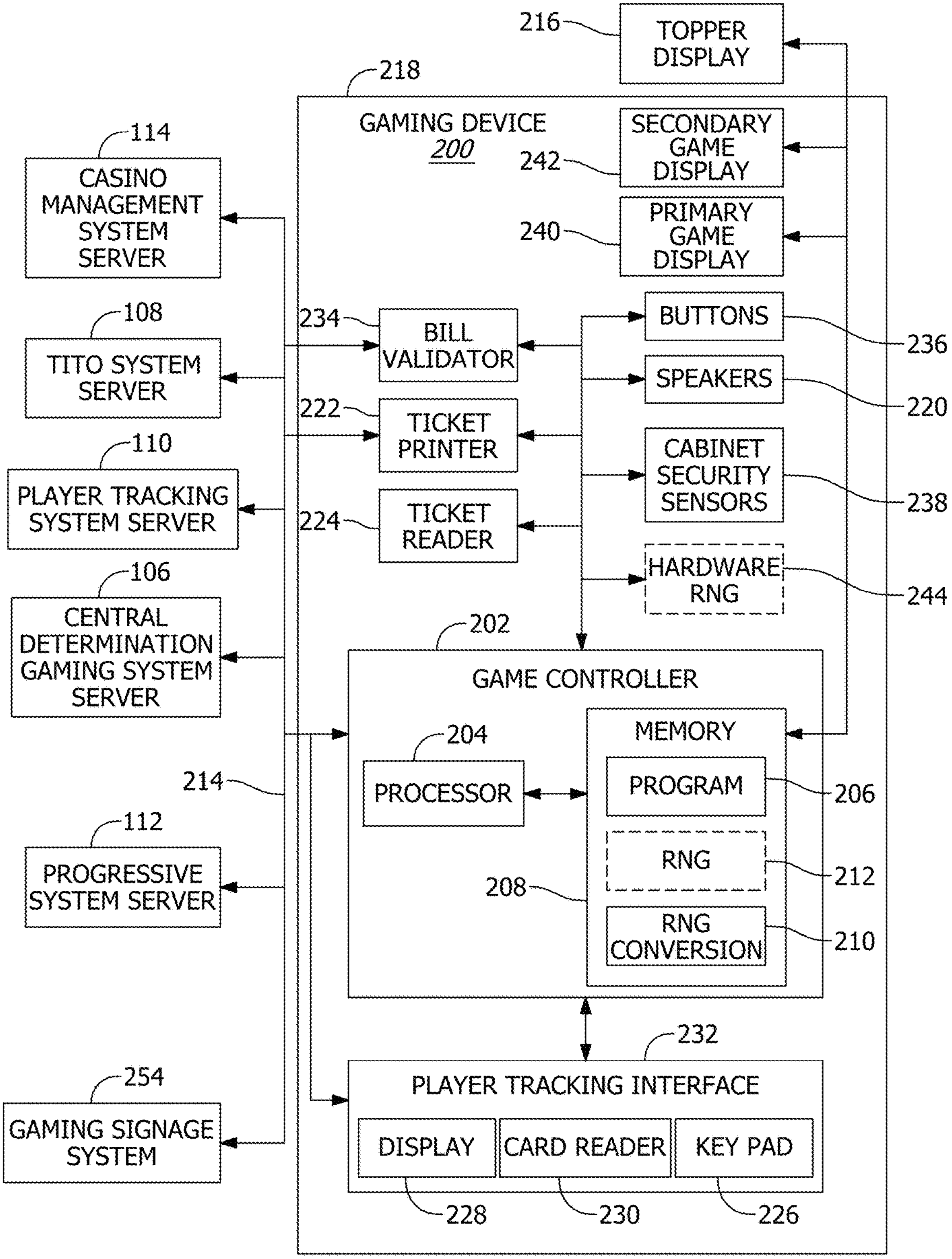
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP.

Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
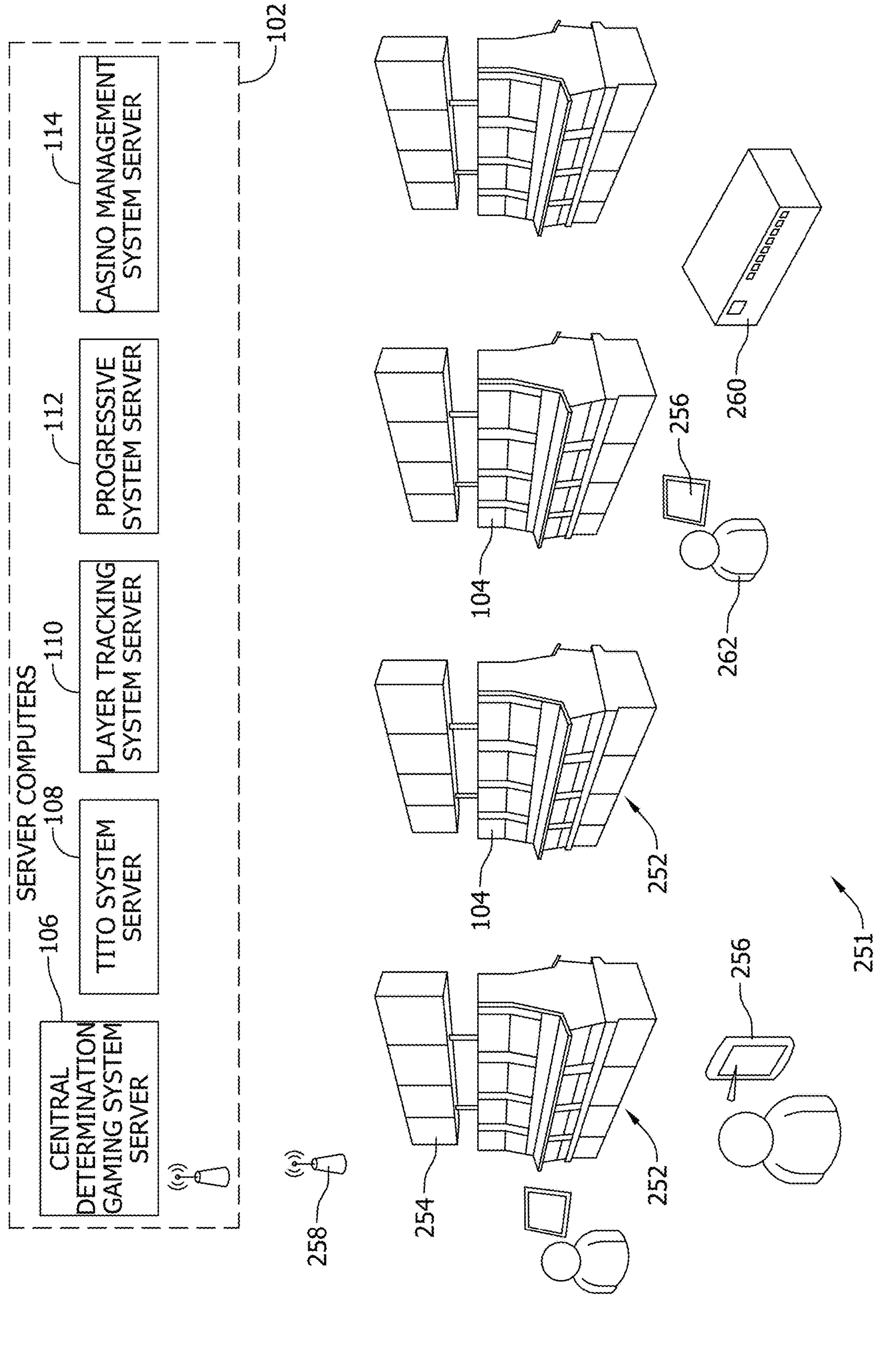
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
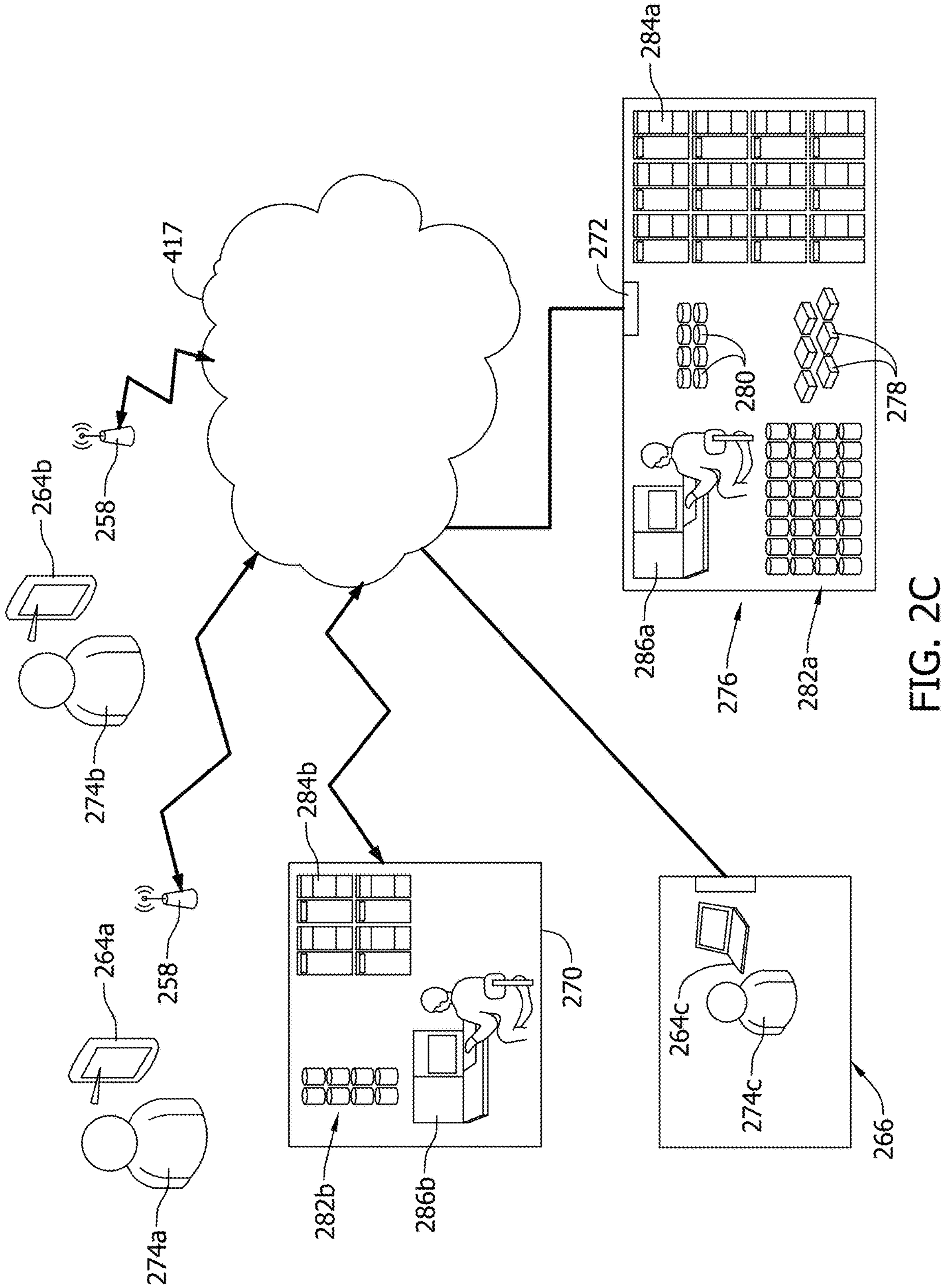
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
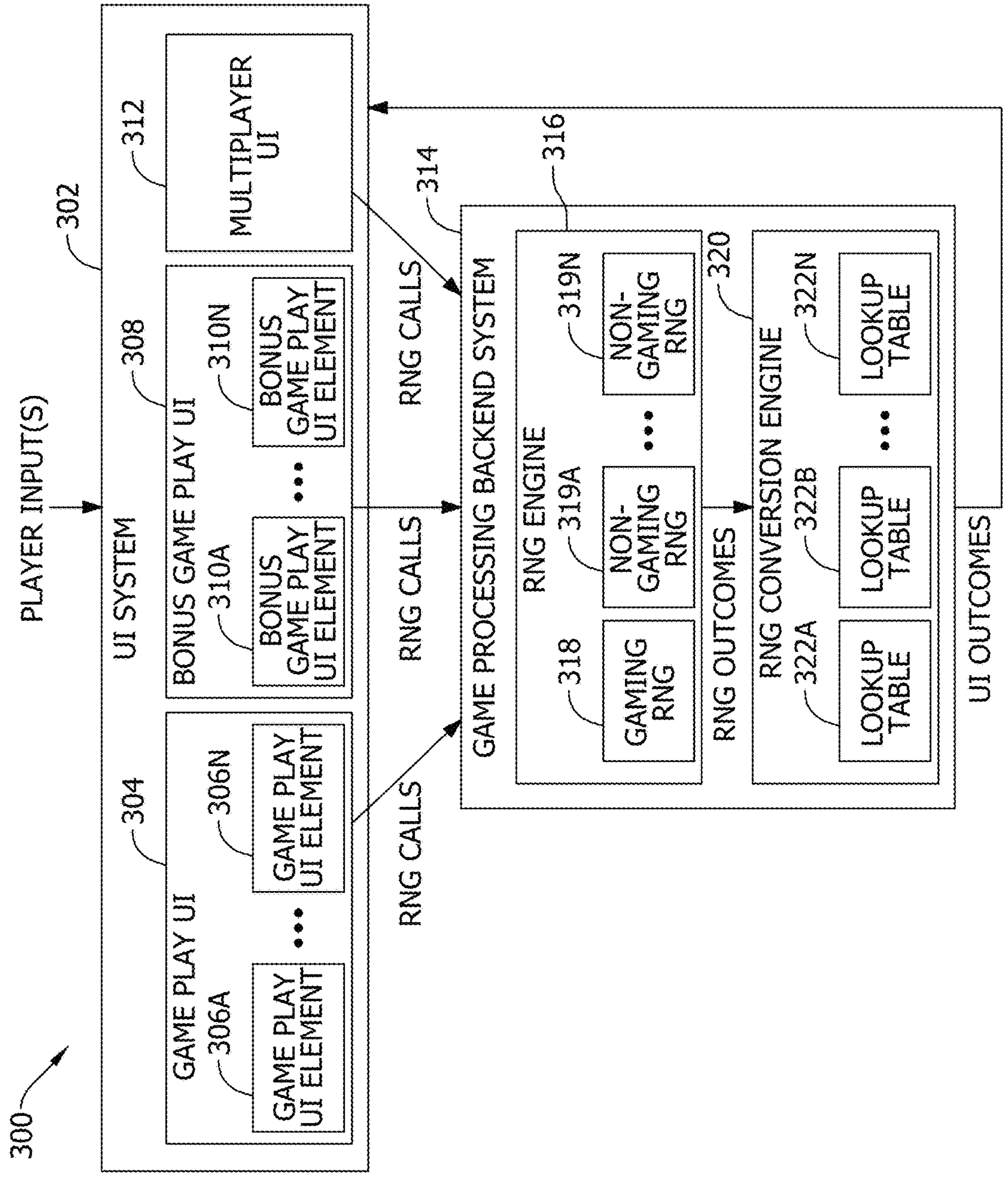
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
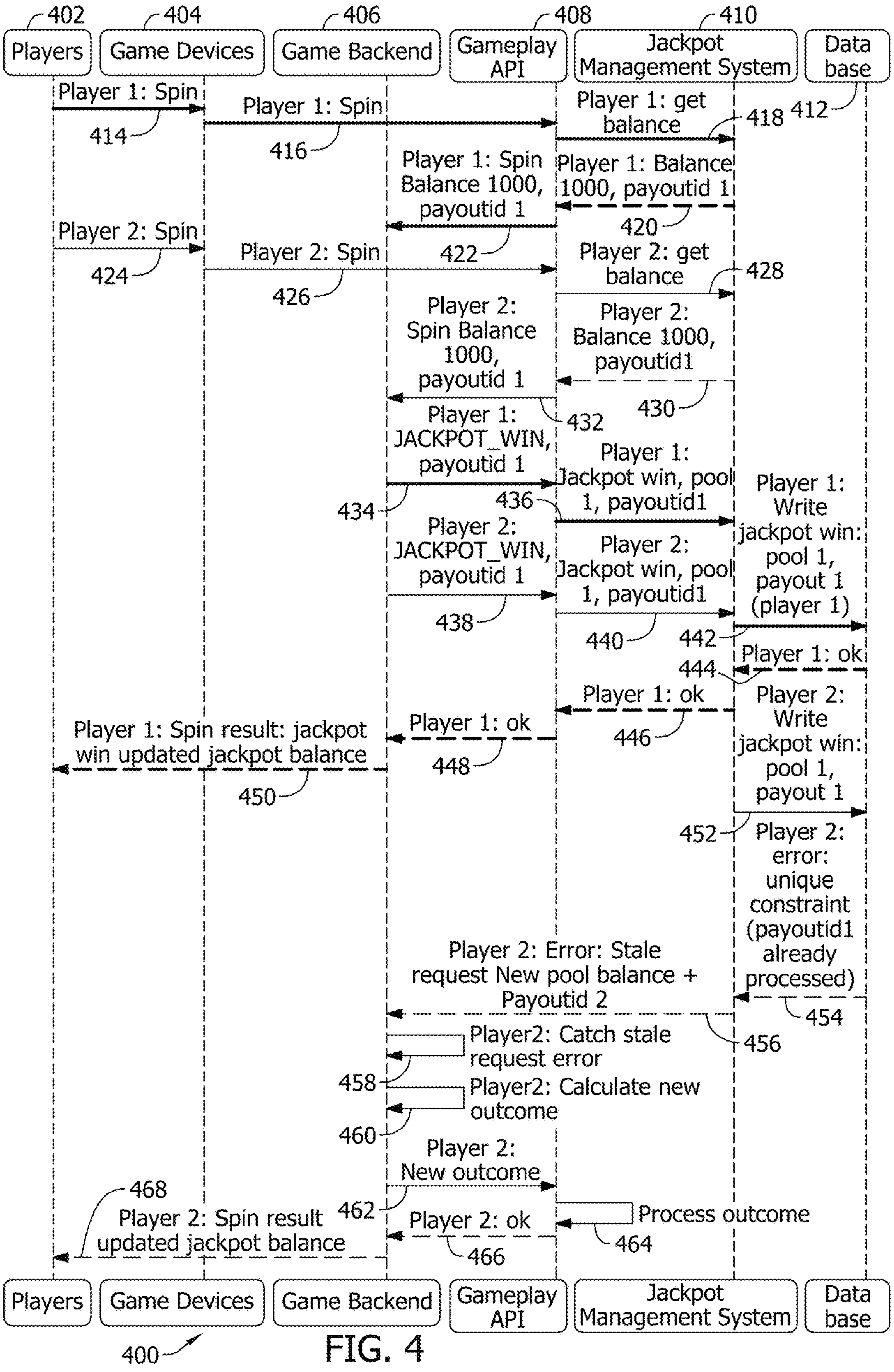
FIG. 4 illustrates an example data flow diagram for dynamically adjusting parameters in electronic gaming environments, in accordance with the present disclosure.

FIG. 4 illustrates an example data flow diagram 400 for dynamically adjusting parameters in electronic gaming environments, in accordance with the present disclosure. As shown in FIG. 4, diagram 400 is implemented by players 402, gaming devices 404 (e.g., gaming devices 104A-X, EUDs 264*a*-*c*, etc.), game backend logic 406 (e.g., at gaming devices 404, one or more servers, such as central determination gaming system server 106, a server at gaming data center 276, etc.), a gameplay application programming interface (API) 408, a jackpot management system 410 (e.g., progressive system server 112), and a database 412.

Notably, any of the systems and methods described herein may be implemented in any of many different gaming environments, including (but not limited to): i) land-based gaming environments (e.g., casinos), ii) mobile gaming environments (e.g., iGaming), and/or iii) convergence gaming environments (e.g., one or more servers that provide outcomes to both land-based gaming devices and mobile devices). Further, the embodiments described herein (e.g., including with respect to FIG. 4) may be applicable to any jackpot or output type (e.g., "Must Drop" jackpots and other jackpot types).

As shown in FIG. 4, a first player 402 may provide an input 414 to a first gaming device 404 (e.g., selection of a SPIN or PLAY button) to initiate a first play of an electronic game. First gaming device 404 then transmits a message 416 to gameplay API 408 indicating that the first play has been initiated. Gameplay API 408 then transmits a request 418 for a balance of a first jackpot associated with the electronic game from jackpot management system 410. In response to the request, jackpot management system 410 transmits a response message 420 to gameplay API 408 that includes the balance of the first jackpot and also a first payout ID associated with the first jackpot. Gameplay API 408 then transmits a message 422 to game backend logic 406 that includes the balance of the first jackpot and the first payout ID (e.g., and/or other parameters of the first jackpot that may be utilized by game backend logic 406 to determine an outcome for the electronic game—for instance, certain amounts of progress of the jackpot amount toward the "Must Drop" may be associated with different odds of the first jackpot being provided). Notably, the first payout ID is provided in diagram 400 at least to prevent multiple payouts of the same jackpot to different players, as described herein in further detail. In the example embodiment, each different jackpot is associated with a unique payout ID.

Further, a second player 402 may provide an input 424 to a second gaming device 404 (e.g., selection of a SPIN or PLAY button) to initiate a second play of an electronic game (e.g., after first player 402 has provided input 414). Second gaming device 404 then transmits a message 426 to gameplay API 408 indicating that the second play has been initiated. Gameplay API 408 then transmits a request 428 for a balance of the first jackpot associated with the electronic game from jackpot management system 410. In response to the request, jackpot management system 410 transmits a response message 430 to gameplay API 408 that includes the balance of the first jackpot and also the first payout ID associated with the first jackpot (e.g., the same balance of the first jackpot and first payout ID as included in response message 420, as the first jackpot has not yet been provided). Gameplay API 408 then transmits a message 432 to game backend logic 406 that includes the balance of the first jackpot and the first payout ID (e.g., and/or other parameters of the first jackpot that may be utilized by game backend logic 406 to determine an outcome for the electronic game).

Continuing the example shown in FIG. 4, game backend logic 406 transmits a message 434 to gameplay API 408 indicating that the play of the electronic game initiated by the first player 402 has triggered a jackpot win. Gameplay API 408 then transmits a message 436 to jackpot management system 410 communicating the jackpot win, and including the first payout ID and a pool from which the first jackpot was won. Shortly thereafter, game backend logic 406 also transmits a message 438 to gameplay API 408 indicating that the play of the electronic game initiated by the second player 402 has also triggered a jackpot win. Gameplay API 408 then transmits a message 440 to jackpot management system 410 communicating the jackpot win, and including the payout ID and the pool from which the first jackpot was won (e.g., the same first payout ID and pool included in message 436).

Based on message 436 being received by jackpot management system 410 before message 440, jackpot management system 410 transmits a message 442 to database 412 indicating that a jackpot from pool 1 has been triggered and including the first payout ID. Database 412 responds with a message 444 to jackpot management system 410 indicating that the first jackpot associated with the first payout ID has not previously been provided (e.g., and therefore the first jackpot is ok to provide). Notably, database 412 is also updated to indicate that the jackpot associated with the first payout ID has been "okayed" and therefore the first payout ID should be "locked" (e.g., to prevent future jackpot wins associated with the first payout ID from being provided).

Upon receipt of message 444, jackpot management system 410 transmits a message 446 associated with the jackpot win by the first player 402 being okayed to gameplay API 408, which transmits a message 448 associated with the jackpot win being okayed to game backend logic 406. Game backend logic 406 then transmits a message 450 that causes the jackpot win amount associated with the first jackpot to be provided to a player account associated with first player 402.

Figure 5:
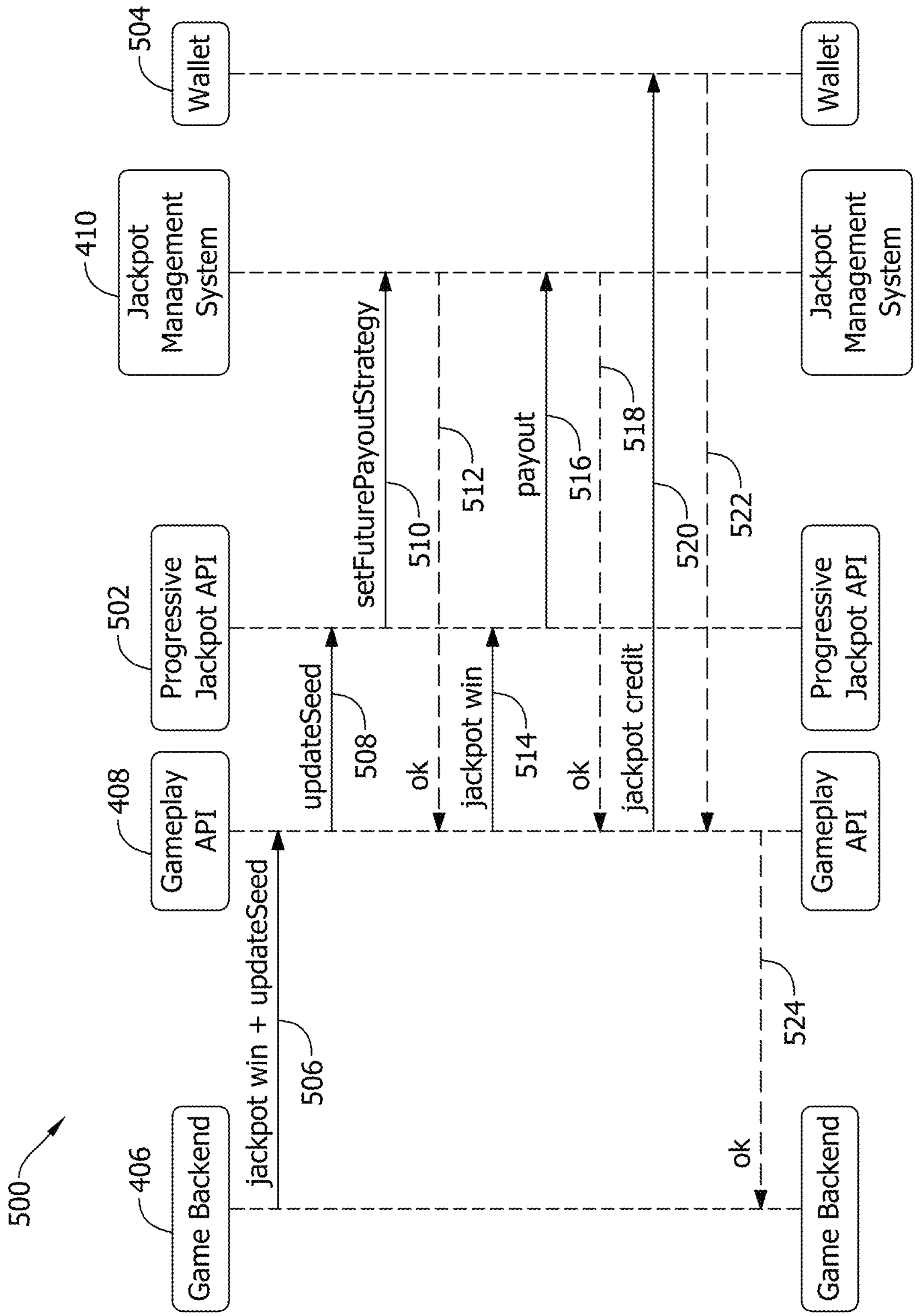
FIG. 5 illustrates another example data flow diagram for dynamically adjusting parameters in electronic gaming environments, in accordance with the present disclosure.

Notably, when the first jackpot is provided, a second jackpot, that is associated with different jackpot parameters than the first jackpot, such as seed, target, and accrual rate is determined. Accordingly, outcomes for future plays of the electronic game are determined based upon the different jackpot parameters until the second jackpot is won (e.g., at which point another new jackpot will be identified). FIG. 5 illustrates an example of a new jackpot being determined.

Continuing the example of FIG. 4, jackpot management system 410 transmits a message 452 to database 412 indicating that a jackpot from pool 1 has been triggered (e.g., by the second player) and including the first payout ID. Database 412 responds with a message 454 to jackpot management system 410 including an error indicating that the first jackpot associated with the first payout ID has previously been provided and/or already been processed (e.g., and therefore the first jackpot is not ok to provide). Notably, the systems and methods described herein provide improvements upon prior systems where no payout ID is utilized and multiple payouts of the same jackpot to different players may occur (e.g., where message 454 would okay the jackpot pay of the first jackpot to the second player instead of including the error, as shown in FIG. 4).

Because message 454 includes the error, instead of transmitting a message to gameplay API 408 (as was the case when the first player jackpot win was okayed), jackpot management system 410 instead transmits a message 456 to game backend logic 406 that causes game backend logic 406 to log 458 the error and generate 460 a new game outcome (e.g., based upon the jackpot parameters associated with the second jackpot). The new game outcome is transmitted in a message 462 from game backend logic 406 to gameplay API 408. Gameplay API 408 then processes 464 the new game outcome (e.g., including determining that the second jackpot has not been triggered) and transmits a message 466 verifying the new game outcome to game backend logic 406, which transmits a message 468 that causes an amount associated with the new game outcome to be provided to a player account associated with the second player 402.

In other words, when the race condition occurred in the above example (e.g., the first player and the second player both initiating plays of the electronic game that would trigger the first jackpot), the first jackpot was prevented from being provided twice (e.g., based upon implementation of the first payout ID) and game backend logic 406 handled the error by re-calculating a game outcome for the second player based upon the jackpot parameters associated with the second jackpot. Notably, because the game outcome for the second player is automatically re-determined after the error occurs, the second player is never made aware that they initiated a play of the electronic game that would have triggered the first jackpot had the first player not initiated a play of the game (e.g., at nearly the same time as the second player) that triggered the first jackpot beforehand.

FIG. 5 illustrates an example data flow diagram 500 for dynamically adjusting parameters in electronic gaming environments, in accordance with the present disclosure. As shown in FIG. 5, data flow diagram 500 is implemented by game backend logic 406, gameplay API 408, a progressive jackpot API 502, jackpot management system 410, and a player digital wallet 504.

In FIG. 5, game backend logic 406 transmits a message 506 to gameplay API 408 indicating that a game outcome for the electronic game includes i) a triggered jackpot and ii) the need for a new jackpot seed to be provided. Accordingly, gameplay API 408 transmits a message 508 to progressive jackpot API 502 indicating that a new jackpot seed needs to be provided, and progressive jackpot API 502 transmits a message 510 to jackpot management system 410 that causes the new jackpot seed to be provided (e.g., including new jackpot parameters, as described herein). Jackpot management system 410 then transmits a message 512 to gameplay API 408 indicating that a new jackpot seed (e.g., including the new jackpot parameters) has been implemented in the electronic game.

Gameplay API 408 then transmits a message 514 to progressive jackpot API 502 indicating that the jackpot has been triggered, and progressive jackpot API 502 transmits a message 516 to jackpot management system 410 requesting that a payout be provided. Jackpot management system 410 then transmits a message 518 to gameplay API 408 indicating that the jackpot win has been verified (e.g., as being associated with a payout ID that was not previously triggered, as indicated by database 412—shown in FIG. 4).

Gameplay API 408 then transmits a message 520 to player digital wallet 504 that causes a jackpot amount associated with the triggered jackpot to be stored in digital wallet 504. Digital wallet 504 then transmits a message 522 to gameplay API 408 confirming that the jackpot amount associated with the triggered jackpot has been stored in digital wallet 504, and gameplay API 408 further transmits a message 524 to game backend logic 406 confirming that the jackpot amount associated with the triggered jackpot has been stored in digital wallet 504.

As explained herein, reseeding of a jackpot may cause new parameters associated with the jackpot to be provided. For instance, the parameters may include a seed value (e.g., a starting value of the jackpot), a target value (e.g., the value of the jackpot at which the probability of hitting the jackpot is 100%), and/or the accrual rate of the jackpot (e.g., the rate at which the jackpot grows).

In some embodiments, the new values of parameters may be randomly selected (e.g., based upon one or more RNG outputs). For instance, seed values and target values may be selected individually based on different weighted values and/or different predefined or custom schedules and/or tables of weights, as explained below. As another example, seed values and target values may be selected in pairs of weighted values.

In the example embodiment, the accrual rate may be part of the initial assignment/selection of values. In some embodiments, the accrual rate may be influenced by a seed and target pair. In some embodiments, the accrual rate, the seed, and the target may all be determined separately (e.g., for maximum randomness).

The selection process may be incremental and/or sequential (e.g., jackpot starts at $77, then $777, then $7777, then $77777 before starting again at $77) and may be performed with or without replacement. For instance, in a without replacement situation, one value may be randomly selected and removed from an array (e.g., continuing the above example, if $7777 is selected, the remaining array would be [$77,$777,$77777]. The selection process is then repeated after each jackpot reset until no values are left (e.g., $77777 is selected and results in the remaining array being [$77, $777], $77 is selected and results in the remaining array being [$777], $777 is selected and results in no values remaining in the array [ ]). After all values in the array have been selected (e.g., and removed from the array), the array of values is reset (e.g., to [$77,$777,$7777,$77777]).

In the example embodiment, the selection process may be influenced by one or more of i) how quickly the previous target was reached, ii) how far from the target the previous jackpot was triggered, iii) the frequency of a particular weighted set of values and when the target was last selected, and/or iv) operator (e.g., casino operator) preferences.

As an example, an operator may be provided (e.g., at a jackpot interface) with a plurality of defined schedules (e.g., pre-certified weight distributions/tables, to control RTP) associated with re-seeded jackpot values (e.g., and/or other jackpot parameters, as explained herein). Weights in the schedules define odds to be used in determining (e.g., by jackpot management system 410) which jackpot value (e.g., starting jackpot value) will be assigned when a jackpot is re-seeded. For example, jackpot management system 410 may utilize a selected schedule when identifying a new jackpot value to be provided (e.g., in response to receipt of message 510, as shown in FIG. 5).

Schedules may have a weight of zero (e.g., a zero percent chance) for certain jackpot values. For example, if a casino operator wants a high value jackpot to be the next jackpot provided (e.g., during a promotional period), a schedule where lower value jackpots have a weight of zero may be selected. As another example, if a casino operator wants a low value jackpot to be the next jackpot provided, a schedule where higher value jackpots have a weight of zero may be selected.

To select a schedule, a casino operator may utilize a specific API and/or jackpot interface associated with the defined schedules. In some embodiments, if weights different from the weights defined in any of the defined schedules are desired, the operator may request custom weights be manually set by a game provider (e.g., by interacting with a jackpot interface, a phone call to the game provider, etc.).

In the example embodiment, a different schedule may be selected up until a jackpot is re-seeded, at which point selection of a new schedule will be associated with the next jackpot re-seed. For example, say a first schedule associated with low weights for high value jackpots is selected and a current jackpot has not been provided but the must drop value is approaching. Further, say that, since the current jackpot was selected, a promotional period has begun. Accordingly, an operator may select a second schedule, associated with higher weights for high value jackpots, so that when the current jackpot is hit, the re-seed is more likely to result in a high value jackpot being selected (e.g., as part of the promotional period, and based upon the second schedule now being selected instead of the first period). Continuing this example, once the promotional period has ended, the operator may re-select the first schedule so that the next jackpot selected will have the lower weights for a high value jackpot being selected (e.g., because the promotional period has now ended).

In the example embodiment, the selected schedule may be communicated in real time or near real time to jackpot management system 410 (e.g., and stored at jackpot management system 410 as being associated with a particular operator and/or property) such that when a new jackpot is needed, a jackpot value in accordance with the selected schedule is accurately provided.

Figure 6:
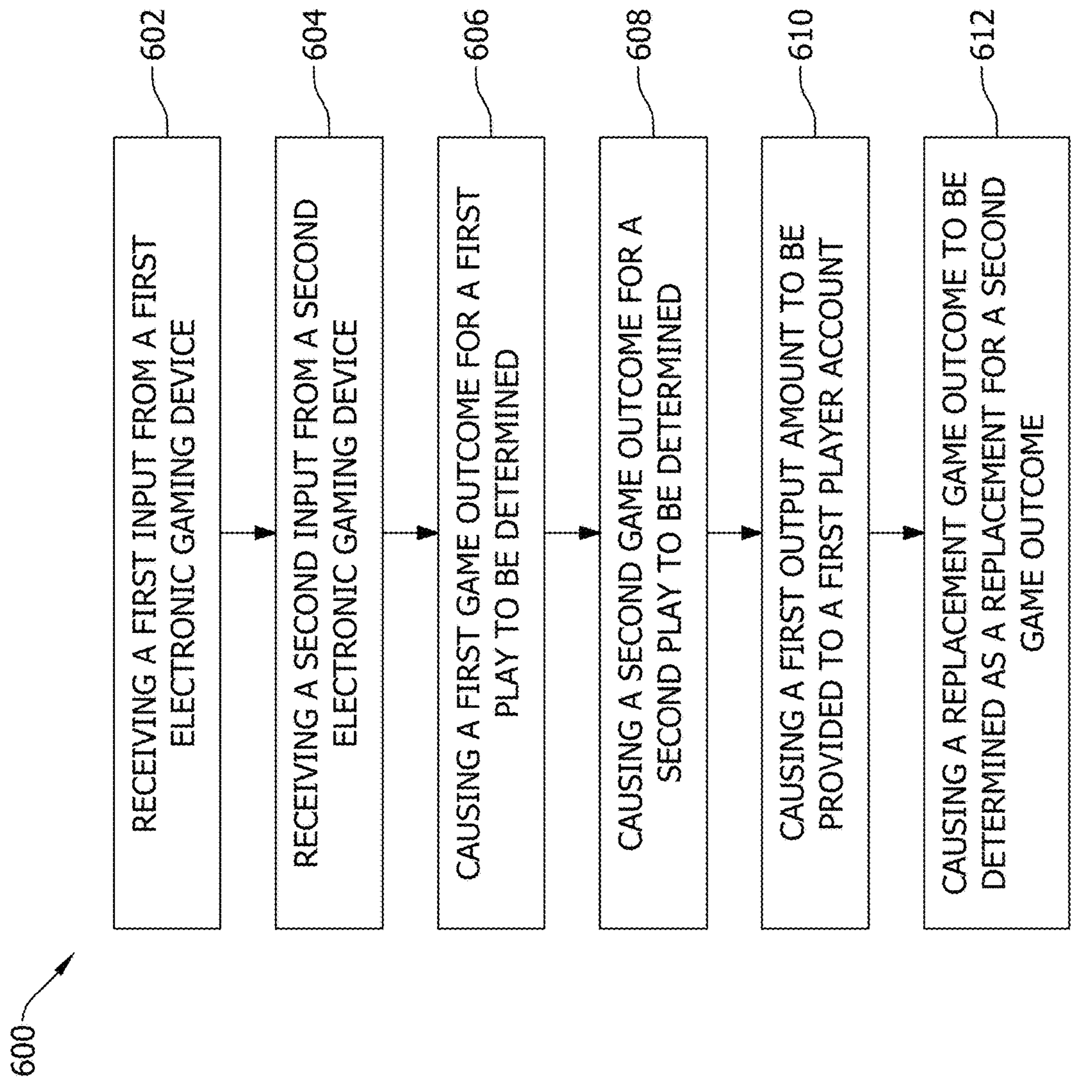
FIG. 6 illustrates an example method for dynamically adjusting parameters in electronic gaming environments, in accordance with the present disclosure.

FIG. 6 illustrates an example method 600 for dynamically adjusting parameters in electronic gaming environments, in accordance with the present disclosure.

In the example embodiment, method 600 includes receiving 602 a first input from a first electronic gaming device associated with initiation of a first play of an electronic game at the first electronic gaming device wherein the first electronic gaming device is associated with a first player account and receiving 604 a second input from a second electronic gaming device associated with initiation of a second play of the electronic game at the second electronic gaming device wherein the second input is received after the first input and wherein the second electronic gaming device is associated with a second player account.

Method 600 also includes causing 606 a first game outcome for the first play to be determined wherein the first game outcome includes a first output amount associated with a first output amount identifier (ID) and causing 608 a second game outcome for the second play to be determined wherein the second game outcome includes the first output amount associated with the first output amount ID.

Method 600 further includes causing 610 the first output amount to be provided to the first player account in response to determining that the first output amount associated with the first output amount ID has not previously been provided and, based upon the first output amount associated with the first output amount ID being provided to the first player account, causing 612 a replacement game outcome to be determined as a replacement for the second game outcome to prevent the first output amount associated with the first output amount ID from being provided to multiple player accounts.

In some embodiments, method 600 also includes, based upon the first game outcome including the first output amount ID, determining that the first output amount has not previously been provided based upon the first output amount ID not previously being saved and/or locked in a database (e.g., database 412).

Figure 7:
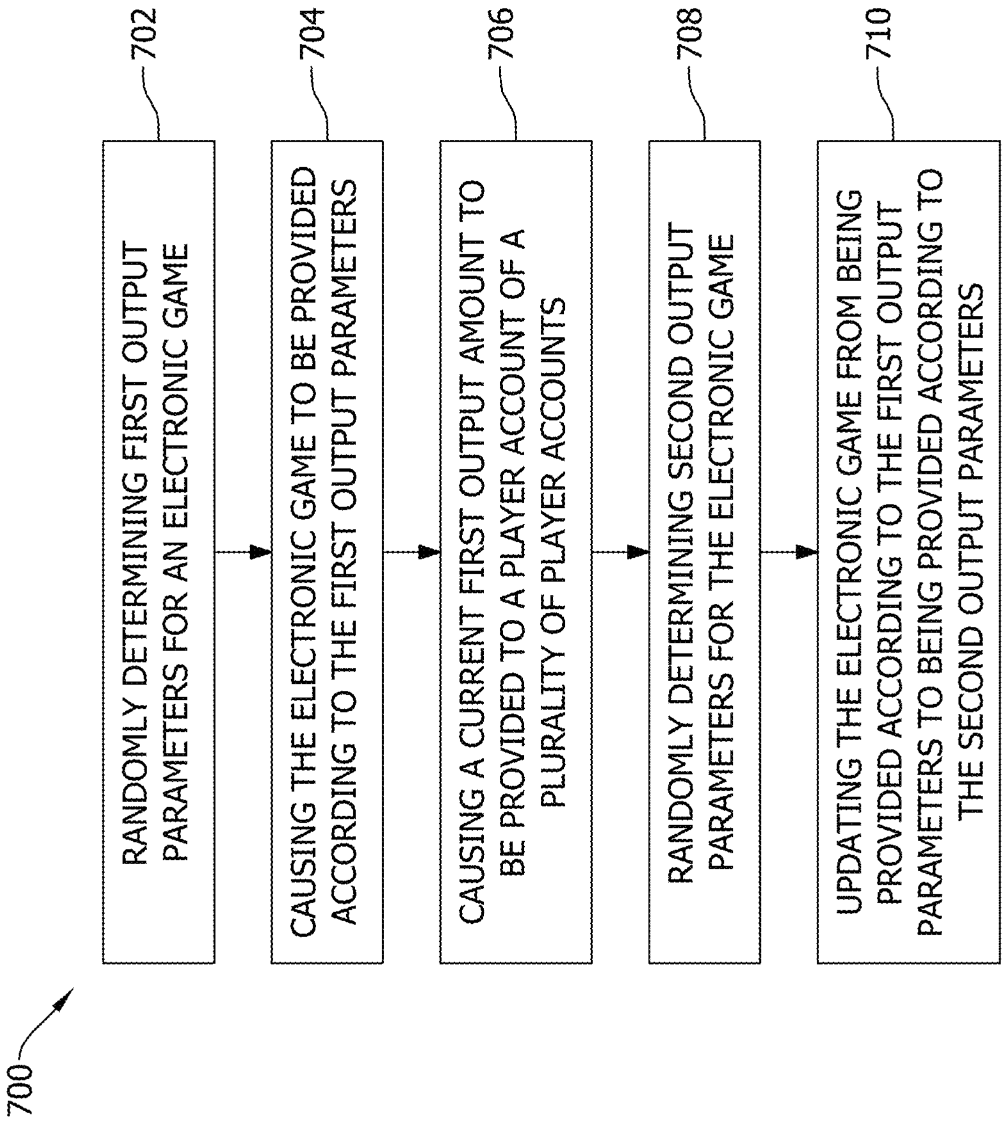
FIG. 7 illustrates another example method for dynamically adjusting parameters in electronic gaming environments, in accordance with the present disclosure.

FIG. 7 illustrates an example method 700 for dynamically adjusting parameters in electronic gaming environments, in accordance with the present disclosure.

In the example embodiment, method 700 includes randomly determining 702 first output parameters for an electronic game played by a plurality of player accounts, the first output parameters including a starting first output amount, a target first output amount greater than the starting first output amount, and a first accrual rate defining a first rate at which the first output amount will increase between the starting first output amount and the target first output amount and causing 704 the electronic game to be provided according to the first output parameters, including determining a current first output amount between the starting first output amount and the target first output amount based on the first accrual rate as first plays of the electronic game occur.

Method 700 also includes causing 706 the current first output amount to be provided to a player account of the plurality of player accounts in response to play of the electronic game associated with the player account triggering an outcome including the current first output amount.

Method 700 further includes, in response to causing the current first output amount to be provided, randomly determining 708 second output parameters for the electronic game, the second output parameters including a starting second output amount, a target second output amount greater than the starting second output amount, and a second accrual rate defining a second rate at which the second output amount will increase between the starting second output amount and the target second output amount and updating 710 the electronic game from being provided according to the first output parameters to being provided according to the second output parameters.

FIGS. 8-17 illustrate example screenshots and/or interfaces 800-1700 of an electronic game including dynamically adjusted parameters, as explained herein.

Figure 8:
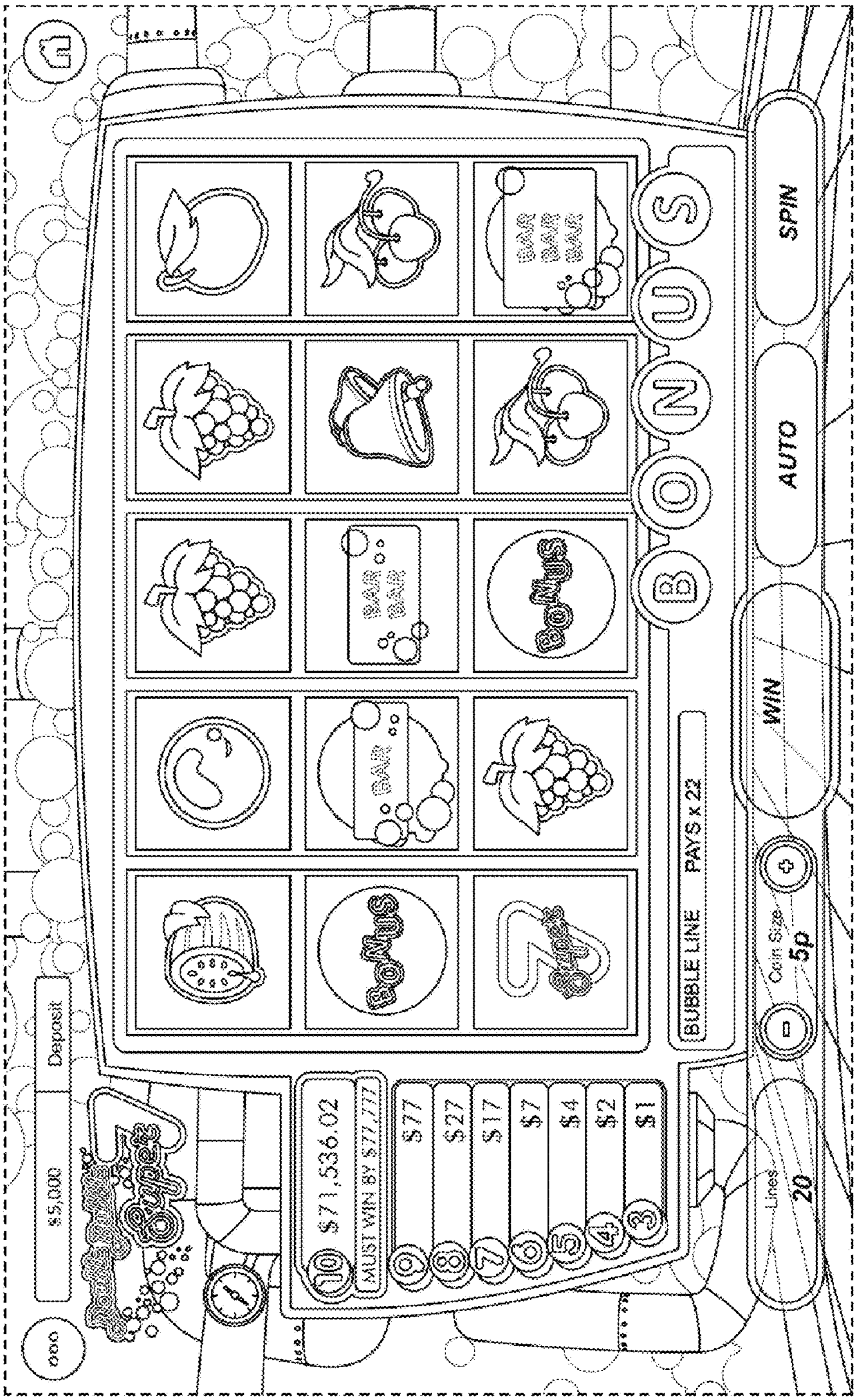
FIGS. 8-17 illustrate example screenshots and/or interfaces of an electronic game including dynamically adjusted parameters, in accordance with the present disclosure.
Figure 10:
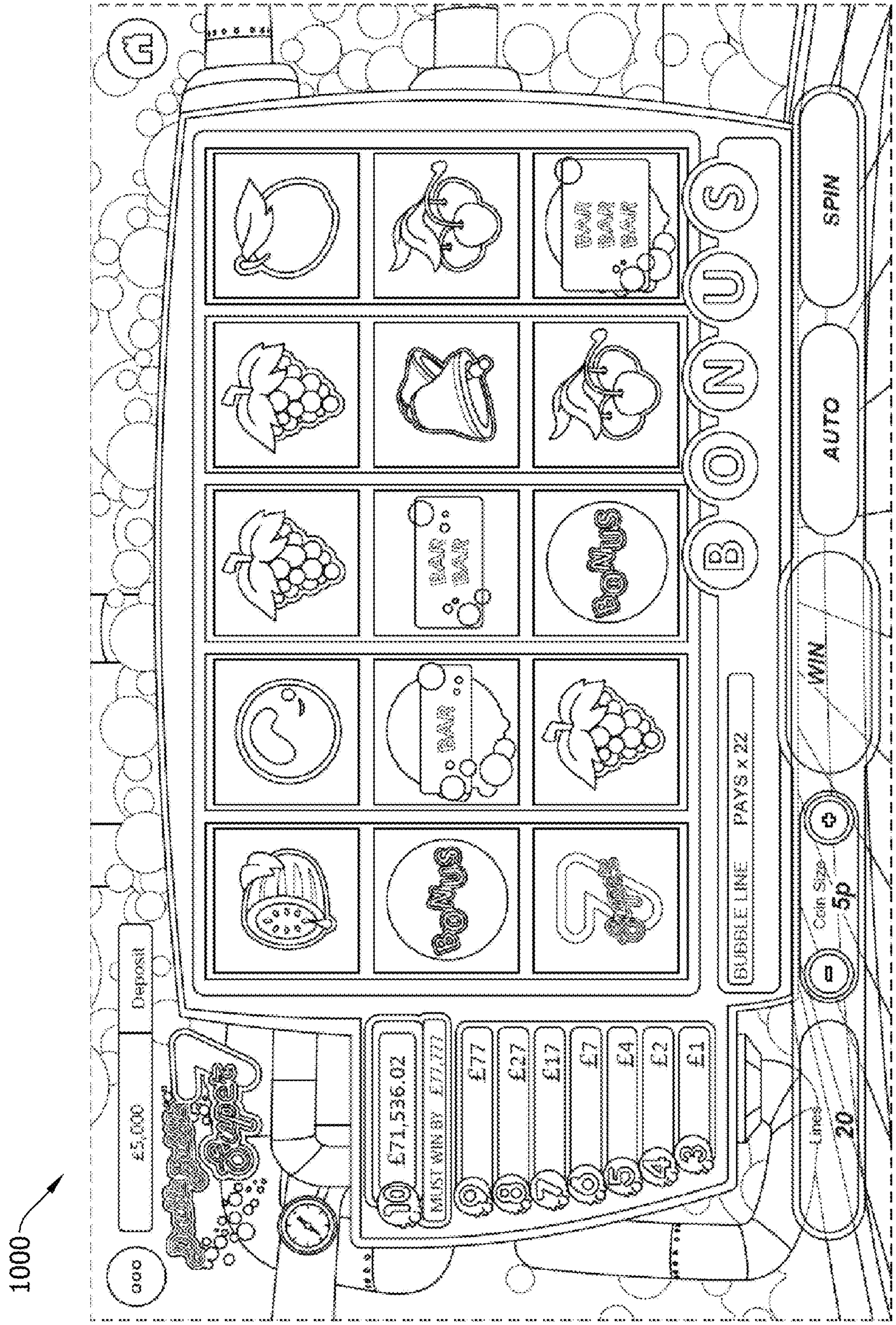
Figure 12:

As examples, FIG. 8 illustrates an example screenshot and/or interface 800 of an electronic game and a must drop (e.g., "MUST WIN BY") value of $77,777. A current jackpot value of $71,536.02 is shown. Thus, the must drop value is relatively close to being hit. FIG. 10 illustrates another example screenshot and/or interface 1000 corresponding to FIG. 8 (e.g., with a different currency type shown). FIG. 12 illustrates another example screenshot and/or interface 1200 corresponding to FIG. 8.

Figure 9:
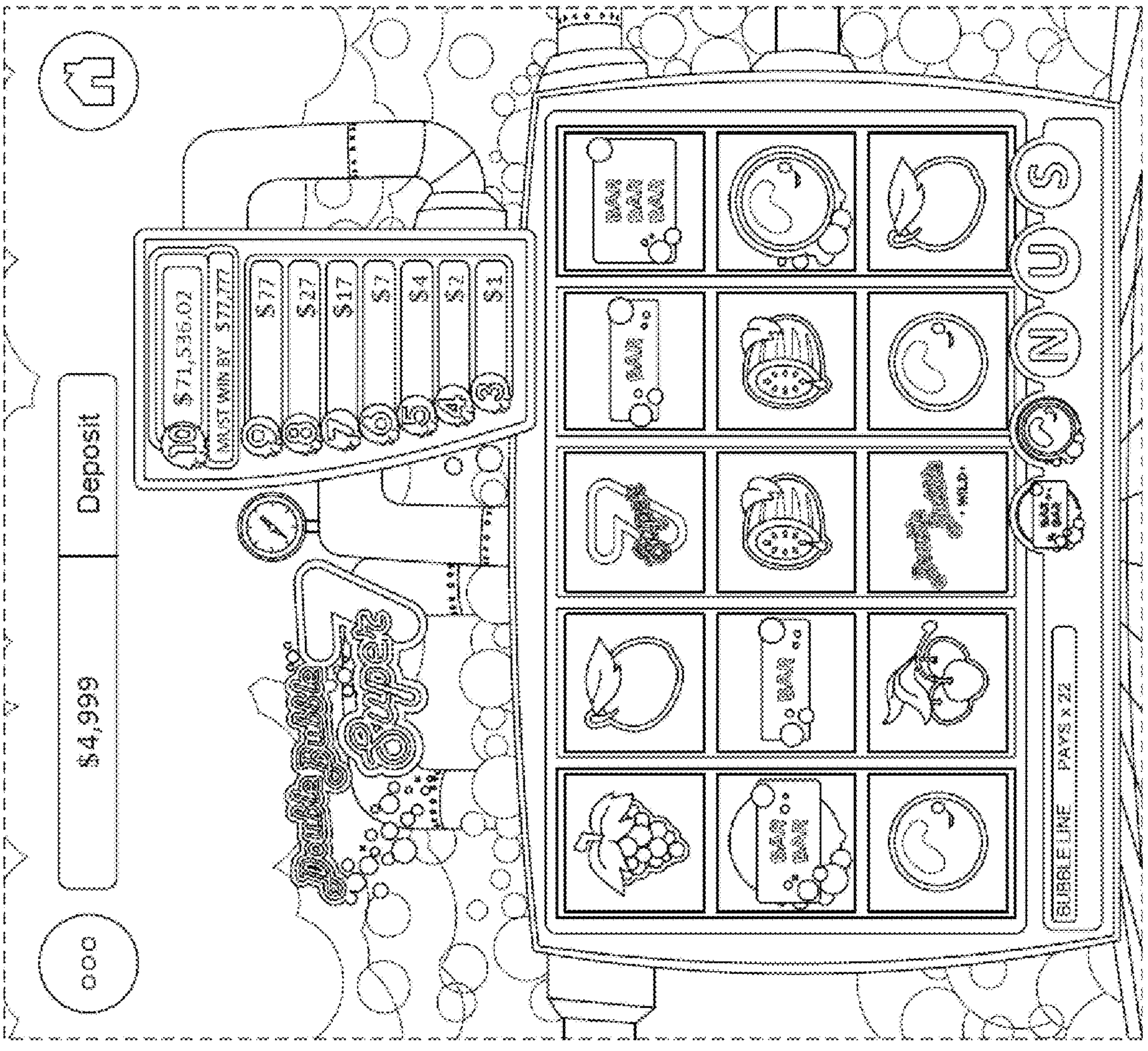
Figure 11:
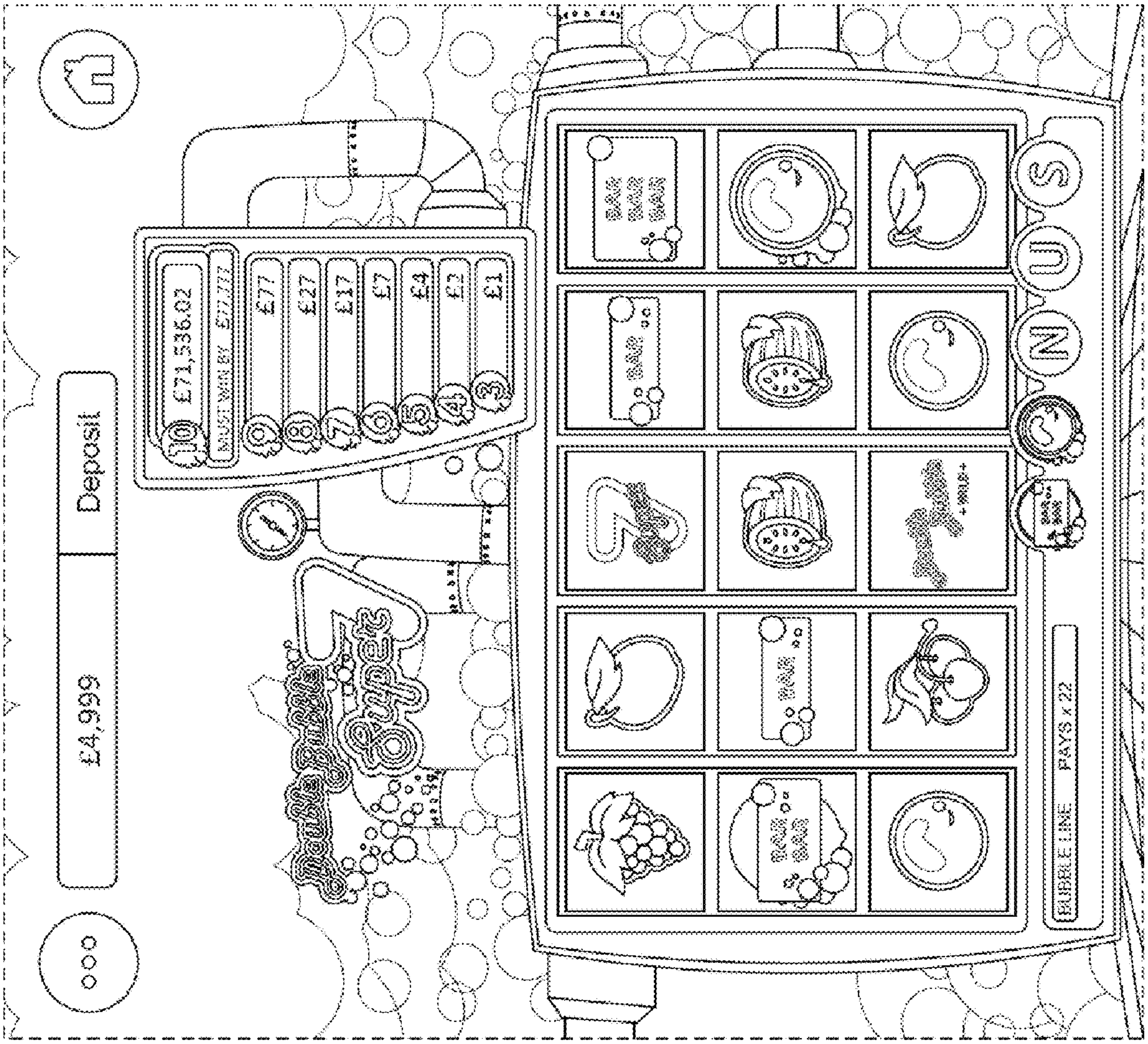
Figure 13:

FIG. 9 illustrates an example screenshot and/or interface 900 similar to screenshot and/or interface 800 but with the must drop value being displayed above the plurality of reels as opposed to on the side of the plurality of reels. FIG. 11 illustrates another example screenshot and/or interface 1100 corresponding to FIG. 9 (e.g., with a different currency type shown). FIG. 13 illustrates another example screenshot and/or interface 1300 corresponding to FIG. 9.

Figure 14:
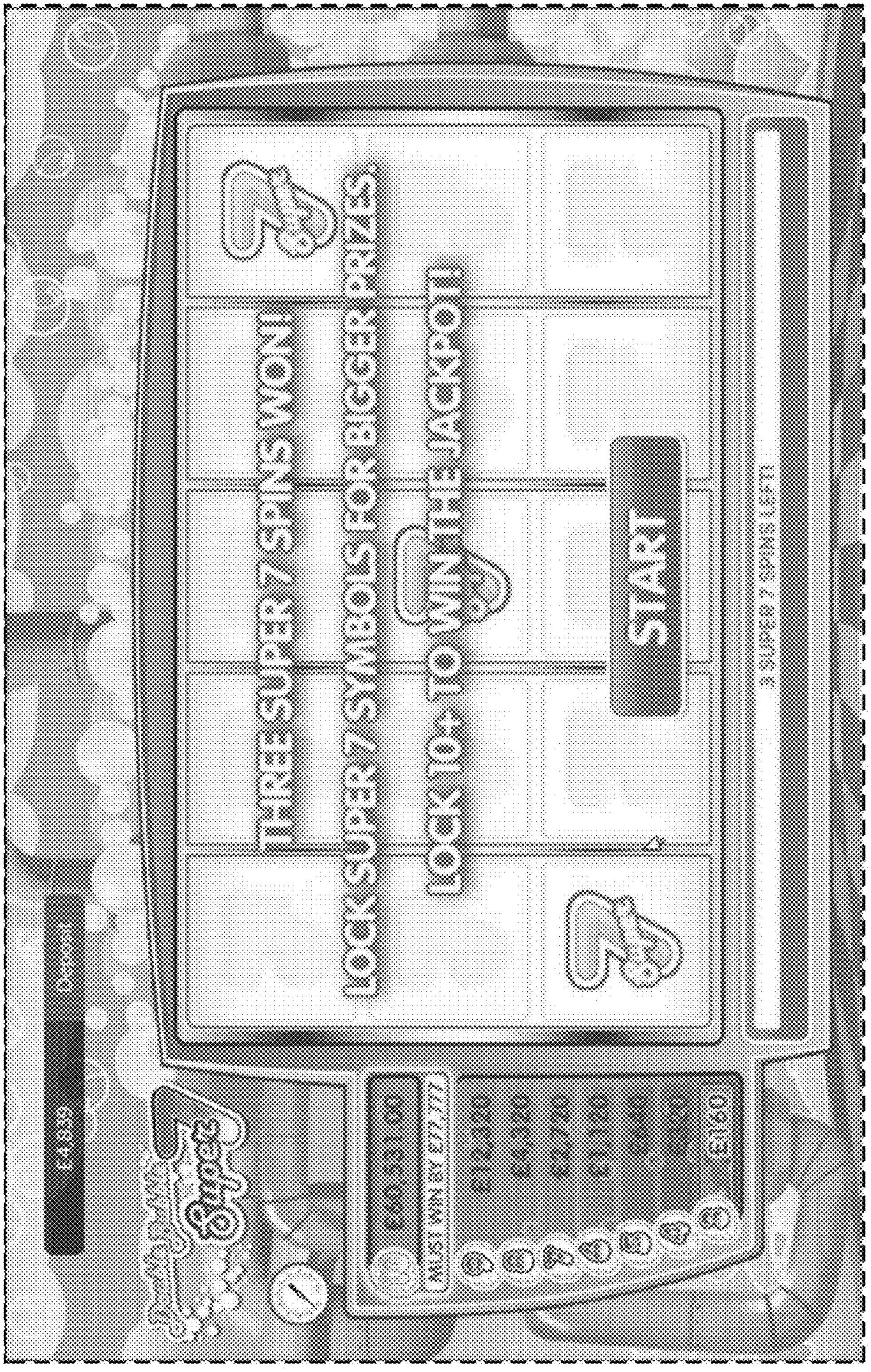
Figure 15:
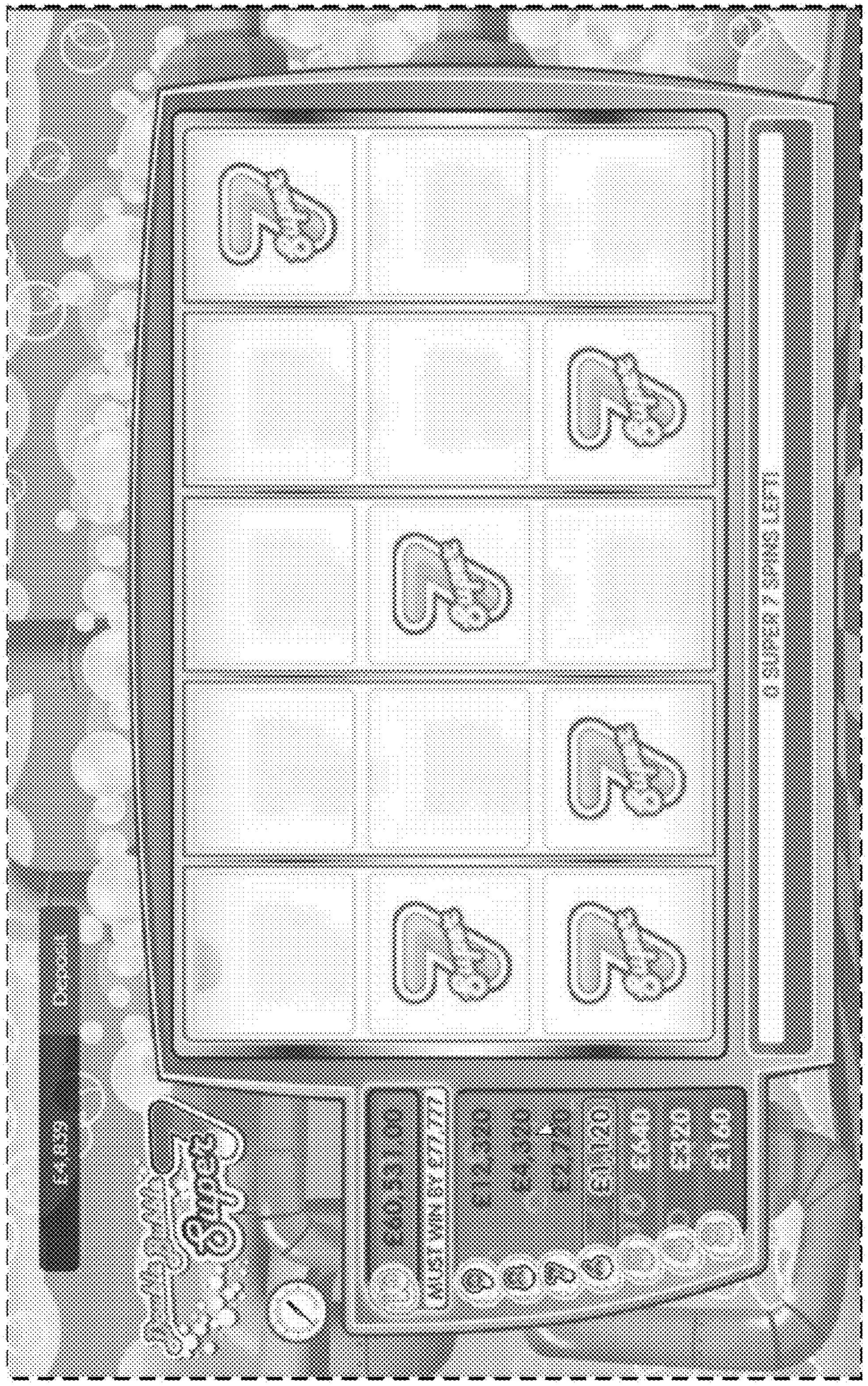
Figure 16:
Figure 17:
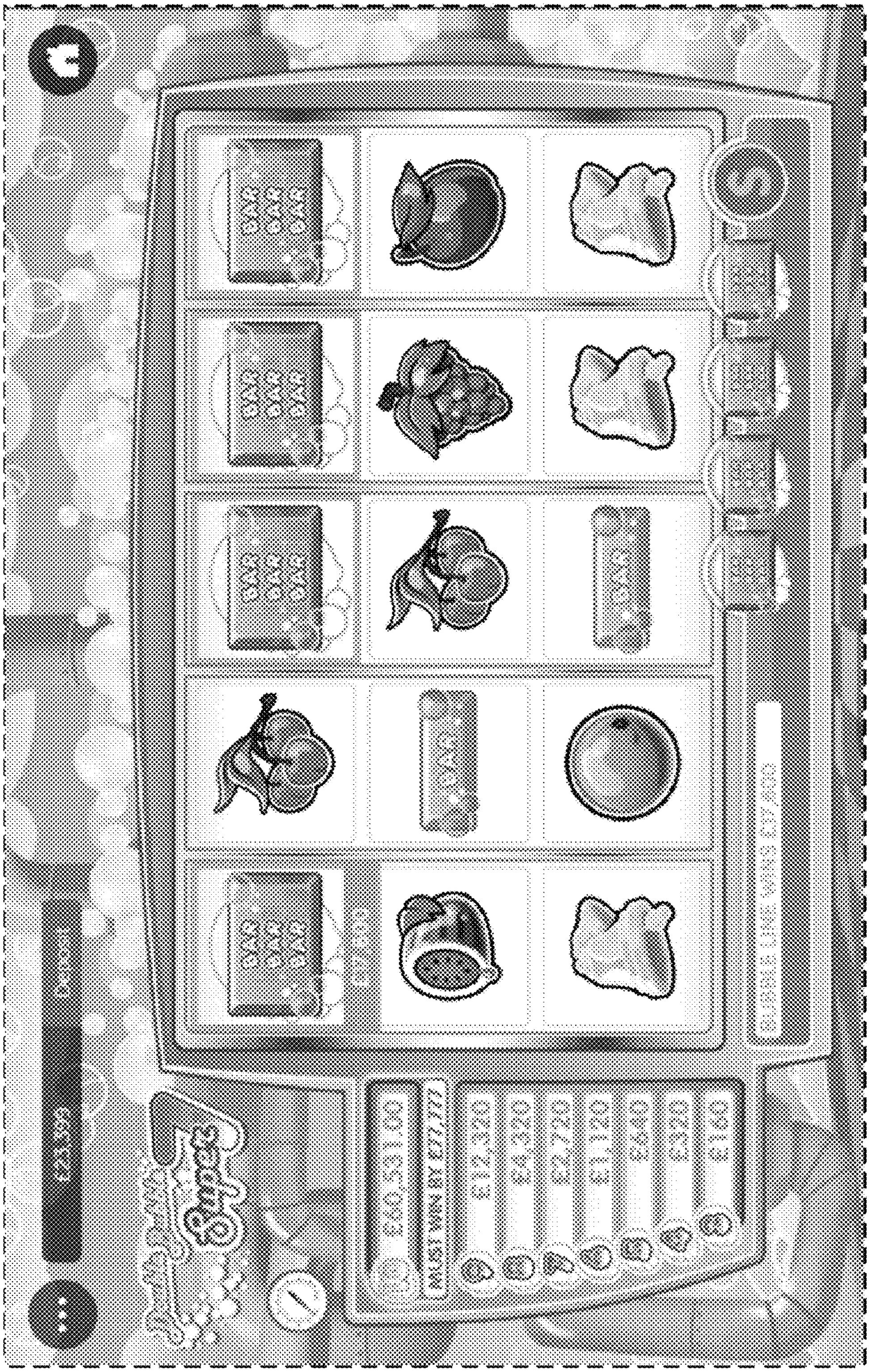

FIG. 14 illustrates an example screenshot and/or interface 1400 of an electronic game where three spins are provided and display of certain symbols causes a certain level of jackpot to be provided. FIG. 15 illustrates an example screenshot and/or interface 1500 where zero spins are remaining in the electronic game shown in FIG. 14 and display of certain symbols (e.g., super seven symbols, as explained in FIG. 14) causes a jackpot level to be at level six (e.g., the level of jackpot may approach the largest jackpot, associated with the must drop value, with display of each super seven symbol). FIG. 16 illustrates an example screenshot and/or interface 1600 where the jackpot value associated with jackpot level six, as shown in FIG. 15, is being provided. FIG. 17 illustrates an example screenshot and/or interface 1700 after a transition back to a base game from the electronic game shown in FIGS. 14-16.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

at least one memory with instructions stored thereon; and at least one processor in communication with the at least one memory, wherein the instructions, when executed by the at least one processor, cause the at least one processor to:

receive a first input from a first electronic gaming device associated with initiation of a first play of an electronic game at the first electronic gaming device, wherein the first electronic gaming device is associated with a first player account;

receive a second input from a second electronic gaming device associated with initiation of a second play of the electronic game at the second electronic gaming device, wherein the second input is received after the first input, and wherein the second electronic gaming device is associated with a second player account;

cause a first game outcome for the first play to be determined, wherein the first game outcome includes a first output amount associated with a first output amount identifier (ID);

cause a second game outcome for the second play to be determined, wherein the second game outcome includes the first output amount associated with the first output amount ID;

cause the first output amount to be provided to the first player account in response to determining that the first output amount associated with the first output amount ID has not previously been provided; and based upon the first output amount associated with the first output amount ID being provided to the first player account, cause a replacement game outcome to be determined as a replacement for the second game outcome to prevent the first output amount associated with the first output amount ID from being provided to multiple player accounts.

2. The electronic gaming system of claim 1, wherein the instructions further cause the at least one processor to, based upon the first game outcome including the first output amount ID, determine that the first output amount has not previously been provided based upon the first output amount ID not previously being saved in a database.

3. The electronic gaming system of claim 2, wherein the instructions further cause the at least one processor to, based upon the first output amount being provided, cause the first output amount ID to be stored in the database.

4. The electronic gaming system of claim 3, wherein the instructions further cause the at least one processor to, based upon the second game outcome including the first output amount ID, search the database for the first output amount ID.

5. The electronic gaming system of claim 4, wherein the instructions further cause the at least one processor to determine that the first output amount was previously provided based upon determining during the search of the database that the first output amount ID is stored in the database.

6. The electronic gaming system of claim 1, wherein the instructions further cause the at least one processor to cause the second game outcome to be determined by transmitting a request message to game backend logic associated with the electronic game.

7. The electronic gaming system of claim 6, wherein the instructions further cause the at least one processor to cause the replacement game outcome to be determined by transmitting an error message associated with the second game outcome to the game backend logic.

8. The electronic gaming system of claim 6, wherein the game backend logic is stored in the at least one memory.

9. The electronic gaming system of claim 6, wherein the game backend logic is stored in a memory device different from the at least one memory.

10. At least one non-transitory computer-readable storage medium with instructions stored thereon that, in response to execution by at least one processor, cause the at least one processor to:

receive a first input from a first electronic gaming device associated with a first play of an electronic game at the first electronic gaming device, wherein the first electronic gaming device is associated with a first player account;

receive a second input from a second electronic gaming device associated with a second play of the electronic game at the second electronic gaming device, wherein the second input is received after the first input, and wherein the second electronic gaming device is associated with a second player account;

control a first game outcome for the first play to be determined, wherein the first game outcome includes a first output amount associated with a first output amount identifier (ID);

control a second game outcome for the second play to be determined, wherein the second game outcome includes the first output amount associated with the first output amount ID;

control the first output amount to be provided to the first player account based upon determining that the first output amount associated with the first output amount ID has not previously been provided; and in response to the first output amount associated with the first output amount ID being provided to the first player account, control a replacement game outcome to be determined as a replacement for the second game outcome to prevent the first output amount associated with the first output amount ID from being provided to multiple player accounts.

11. The at least one non-transitory computer-readable storage medium of claim 10, wherein the instructions further cause the at least one processor to, in response to the first game outcome including the first output amount ID, determine that the first output amount has not previously been provided based upon the first output amount ID not previously being saved in a database.

12. The at least one non-transitory computer-readable storage medium of claim 11, wherein the instructions further cause the at least one processor to, in response to the first output amount being provided, control the first output amount ID to be stored in the database.

13. The at least one non-transitory computer-readable storage medium of claim 12, wherein the instructions further cause the at least one processor to, in response to the second game outcome including the first output amount ID, query the database for the first output amount ID.

14. The at least one non-transitory computer-readable storage medium of claim 13, wherein the instructions further cause the at least one processor to determine that the first output amount was previously provided in response to determining during the query of the database that the first output amount ID is stored in the database.

15. The at least one non-transitory computer-readable storage medium of claim 10, wherein the instructions further cause the at least one processor to control the second game outcome to be determined by transmitting a request message to game backend logic associated with the electronic game.

16. The at least one non-transitory computer-readable storage medium of claim 15, wherein the instructions further cause the at least one processor to control the replacement game outcome to be determined by transmitting an error message associated with the second game outcome to the game backend logic.

17. The at least one non-transitory computer-readable storage medium of claim 16, wherein the game backend logic is stored in the at least one non-transitory computer-readable storage medium.

18. The at least one non-transitory computer-readable storage medium of claim 16, wherein the game backend logic is stored in a memory device different from the at least one non-transitory computer-readable storage medium.

19. A method of electronic gaming implemented by at least one processor in communication with at least one memory, the method comprising:

receiving a first input from a first electronic gaming device associated with initiation of a first play of an electronic game at the first electronic gaming device, wherein the first electronic gaming device is associated with a first player account;

receiving a second input from a second electronic gaming device associated with initiation of a second play of the electronic game at the second electronic gaming device, wherein the second input is received after the first input, and wherein the second electronic gaming device is associated with a second player account;

causing a first game outcome for the first play to be determined, wherein the first game outcome includes a first output amount associated with a first output amount identifier (ID);

causing a second game outcome for the second play to be determined, wherein the second game outcome includes the first output amount associated with the first output amount ID;

causing the first output amount to be provided to the first player account in response to determining that the first output amount associated with the first output amount ID has not previously been provided; and based upon the first output amount associated with the first output amount ID being provided to the first player account, causing a replacement game outcome to be determined as a replacement for the second game outcome to prevent the first output amount associated with the first output amount ID from being provided to multiple player accounts.

20. The method of claim 19, further comprising, based upon the first game outcome including the first output amount ID, determining that the first output amount has not previously been provided based upon the first output amount ID not previously being saved in a database.

* * * * *